(12) United States Patent
Lee et al.

(10) Patent No.: US 7,128,066 B2
(45) Date of Patent: Oct. 31, 2006

(54) DIAMOND TOOL WITH METAL PLATE INSERTED THEREIN

(75) Inventors: Hwan Chul Lee, Incheon (KR); Seo Pong Pyun, Incheon (KR); Sang Do Lee, Gyeonggi-do (KR); Byung Lyul Jin, Incheon (KR); Sang Jin Lee, Incheon (KR); Tae Ung Um, Cerritos, CA (US); Yong Seob Shim, Incheon (KR); Shin Kyung Kim, Seoul (KR)

(73) Assignee: Shihan Diamond Industrial Co., Ltd., Incheon (KR)

( * ) Notice: Subject to any disclaimer, the term of this patent is extended or adjusted under 35 U.S.C. 154(b) by 0 days.

(21) Appl. No.: 11/118,165

(22) Filed: Apr. 28, 2005

(65) Prior Publication Data

US 2005/0249560 A1  Nov. 10, 2005

(30) Foreign Application Priority Data

May 10, 2004  (KR) ............... 10-2004-0032559

(51) Int. Cl.
*B28D 1/12* (2006.01)
(52) U.S. Cl. ............................ 125/22; 125/12
(58) Field of Classification Search ............ 125/15, 125/18, 22; 451/544, 546; 51/297, 298
See application file for complete search history.

(56) References Cited

U.S. PATENT DOCUMENTS 2,092,591 A * 9/1937 Sohlstrom .................. 451/546
6,408,838 B1 * 6/2002 Ogata et al. ................ 125/15

* cited by examiner

*Primary Examiner*—Dung Van Nguyen
(74) *Attorney, Agent, or Firm*—Marger Johnson & McCollom, p.c.

(57) ABSTRACT

Disclosed is a diamond tool having a metal plate inserted therein. Between abrasive layers containing diamond particles is inserted a ferrous or non-ferrous metal plate having a wear resistance lower than that of the abrasive layers such that a concave groove is spontaneously formed during a cutting process, thereby reducing the contact load with a workpiece to thereby avoid vibration (wobbling) of a shank, and providing a discharge path for smoothly removing cutting chips and the cooling water. In addition, the content of abrasives and the wear resistance of bonding material are uniformly constituted so that the shrinkage rate does not need to be considered during sintering and the manufacturing process can be simplified, thereby reducing the manufacturing cost and improving the productivity therefor. Furthermore, the area of the metal plate can be controlled, thereby enabling an easy design conforming to the working conditions with a workpiece.

18 Claims, 12 Drawing Sheets (a)

DIAMOND TOOL WITH METAL PLATE INSERTED THEREIN

The present invention claims the benefit of Korean Patent Application No. 2004-32559 filed on May 10, 2004, which is hereby incorporated by reference.

BACKGROUND OF THE INVENTION

1. Field of the Invention

The present invention relates to a diamond tool. More particularly, the invention relates to a diamond tool with a metal plate inserted therein, in which between abrasive layers containing diamond particles is inserted a ferrous or non-ferrous metal plate having a wear resistance lower than that of the abrasive layers so that a concave groove is spontaneously formed during a workpiece cutting process, thereby reducing the contact load with a workpiece to thereby avoid vibration (wobbling) of a shank and providing a discharge path through cutting chips and the cooling water are smoothly removed. In addition, the invention is applied to all the applicable tools such as a saw, a core drill, a cutter, a saw blade, a wire saw, and the like.

2. Background of the Related Art

In general, a diamond tool comprises a diamond grinding stone portion that is attached to a shank to cut and grind a workpiece, and a shank through which the grinding stone portion is mounted to a cutting or grinding machine. Here, the cutting tip comprises a plurality of diamond particles and a metallic bonding material. Diamond, abrasive or diamond particle generally means a natural or synthetic diamond, cubic boron nitride, and additionally a super abrasive such as silicone carbide and alumina and also a mixture of at least two of the aforementioned materials. Furthermore, the shank is commonly formed of a metallic material such as stainless steel and carbon steel.

As a method of bonding the abrasive or grinding stone portion to a shank, a sintered-tip welding method (hereinafter, referred to as a "sintering method") has been known. In this sintering method, a metallic bonding material and abrasives are generally mixed, press-formed and sintered to form a cutting tip, and then the sintered cutting tip is bonded to a shank through a silver brazing, a laser welding, or a resistance welding.

Figure 1A:
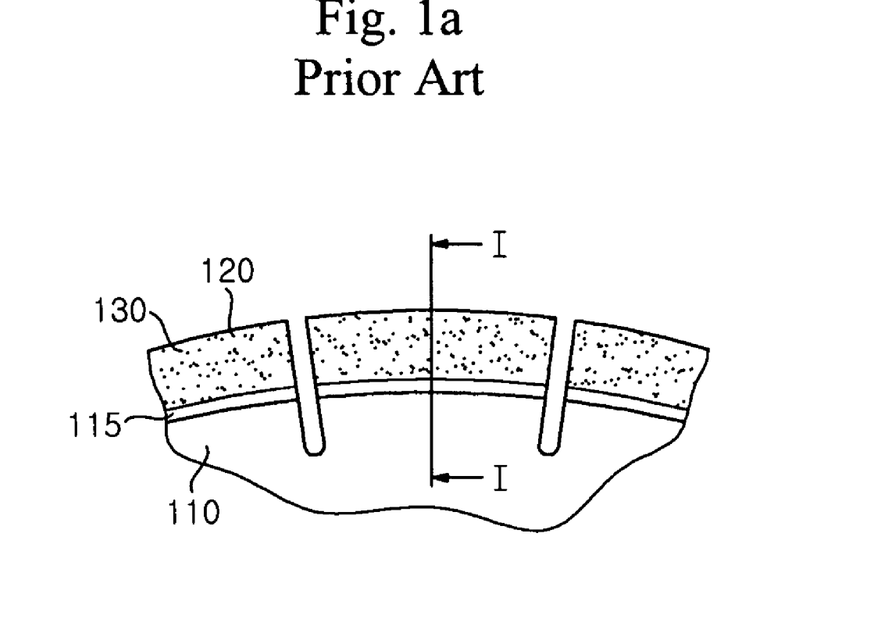
FIG. 1a is a partial front view of a conventional saw blade where a cutting tip formed by a sintering method is attached to a shank.
Figure 1B:
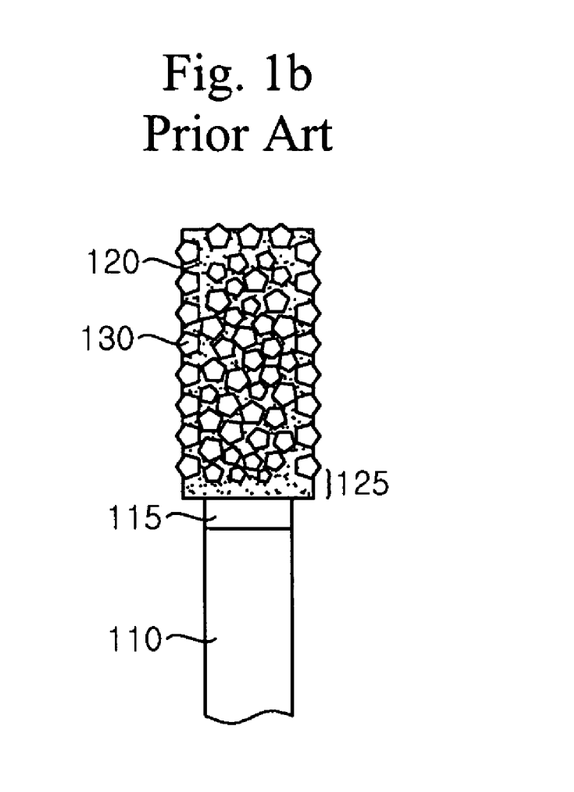

FIG. 1a is a partial front view of a conventional saw blade where a cutting tip formed by a sintering method is attached to a shank. FIG. 1b is a cross-section taken along line I—I of FIG. 1a.

A typical saw blade has the shape of a circular plate, and a plurality of cutting tips are formed at regular intervals along the circumference thereof in such a manner that they protrude in a radial direction. FIGS. 1a and 1b show a part of the cutting tips. As previously described, in the sintering method, a metallic bonding material 120 and abrasives 130 are beforehand mixed, press-formed, and sintered. Thus, as shown in FIG. 1b, the cutting tip has such a structure that a plurality of abrasives 130 are non-uniformly dispersed in the metallic bonding material 120. This cutting tip is bonded to a shank 110 through a welded portion 115 formed through a laser welding, a silver brazing, or a resistance welding. Here, the cutting tip is provided with a blank 125 formed at the bonding area with the shank 110. The blank 125 has only a bonding material without the abrasives 130 so that a subsequent laser welding with the shank 110 can be easily performed.

As another method of manufacturing a saw blade, it has been known a method of simultaneously compacting and sintering together with a shank, which is different from the aforementioned method. In this simultaneous compacting and sintering method, a shank 110 is positioned at the center of a mold, and a powder mixture of metallic bonding material 120 and diamond particles 130 is filled in the mold. Then, the metallic bonding material 120 and the abrasives 130 are powder-compacted and sintered, along with the shank 110, thereby fabricating a diamond tool. This method is commonly used in manufacturing general cutter products. Hereinafter, therefore, a sintering method means all the methods of fabricating diamond tools, including the method where a cutting tip is separately formed and bonded to a shank through a laser welding, a silver brazing, and a resistance welding, the simultaneous compacting and sintering method, and the like.

Figure 2:
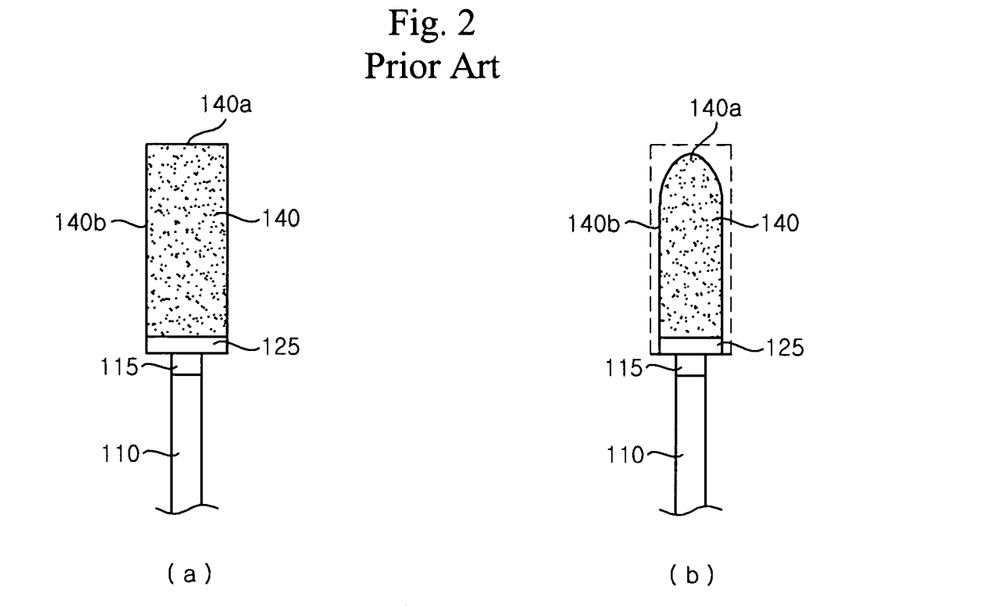
FIG. 2 is a conventional saw blade formed by a sintering method, showing a worn state of the cutting tip thereof.

On the other hand, it should be noted that the size and shape of diamond particles shown in FIGS. 2a and 2b (including the other figures) are exaggerated relative to those of a shank 110 or the like, for the purpose of clear illustration therefor, and also the number of illustrated diamond particles may be more or less than the actual number thereof.

FIG. 2 shows a worn state of the cutting tip of a conventional saw blade formed by a sintering method when the conventional saw blade is used to cut a workpiece.

FIG. 2(a) is a partial sectionals view showing a cutting tip 140 comprised of a metallic bonding material 120 and abrasives 130, and a shank 110 with the cutting tip 140 attached thereto in the saw blade of FIG. 1b. That is, FIG. 2(a) shows a state before the cutting tip 140 is used. When the above saw blade is used for cutting a workpiece, the cutting process is carried out initially while the leading edge portion 140a of the cutting tip 140 contacts the workpiece. Then, the side portion 140b of the cutting tip 140 is also participated in the cutting process, along with the leading edge portion 140a thereof.

In the above conventional saw blade, the leading edge portion 140a of the cutting tip 140 is flat and thus its initial cutting force is lowered due to an increased load in the initial cutting process. In addition, as the saw blade is used over time, the cutting tip 140 is worn gradually. At this time, the height and width of the cutting tip 140 are reduced and also the leading edge portion 140a thereof becomes rounded, as shown in FIG. 2(b). This rounded shape of the leading edge portion 140a results from the fact that the cutting work is performed most actively at an area where the leading edge and the side portion of the cutting tip join with each other. In this way, during the cutting process, the leading edge portion 140a is worn to a rounded shape, and thus, the friction area thereof is increased to thereby cause a wobbling phenomenon, which leads to degradation in the cutting performance thereof. Furthermore, when machining a workpiece, an appropriate discharge path for the release of cutting chips and the cooling water is not provided, thereby failing to provide an excellent cutting performance.

FIG. 2a shows a worn state of the cutting tip of a conventional saw blade when the conventional saw blade spontaneously forming a convex groove during the cutting process is used to cut a workpiece.

Figure 3A:
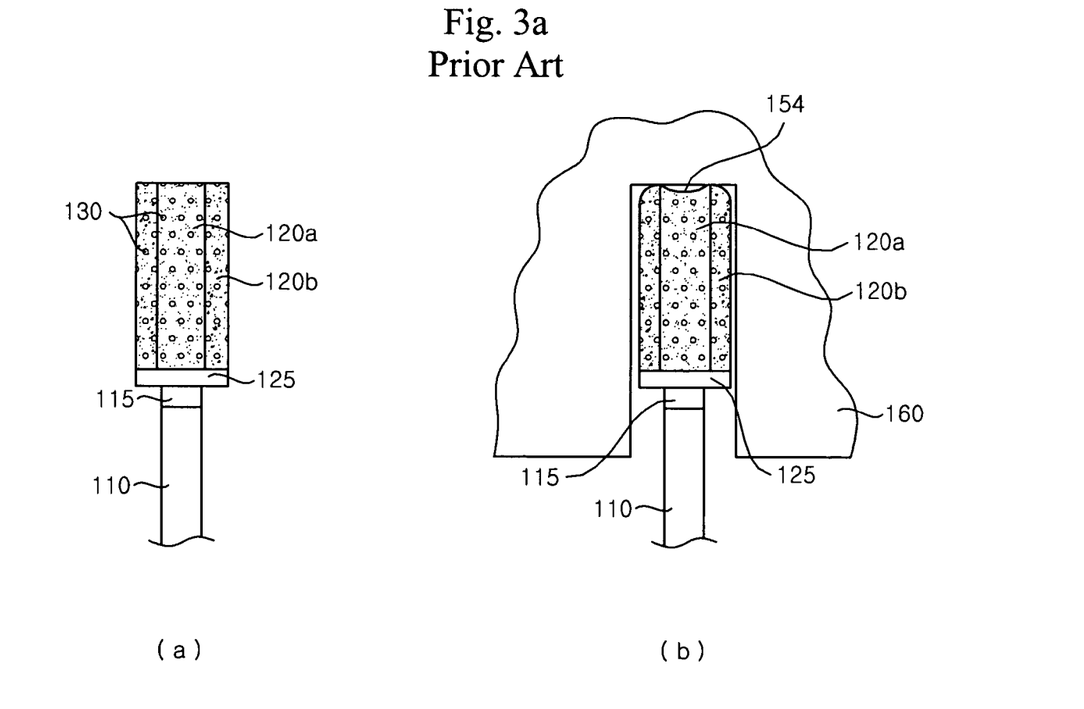
FIG. 3a–3c are cross-sectional views of a conventional cutting tip forming a concave groove during the cutting process using a conventional saw blade.
Figure 3B:
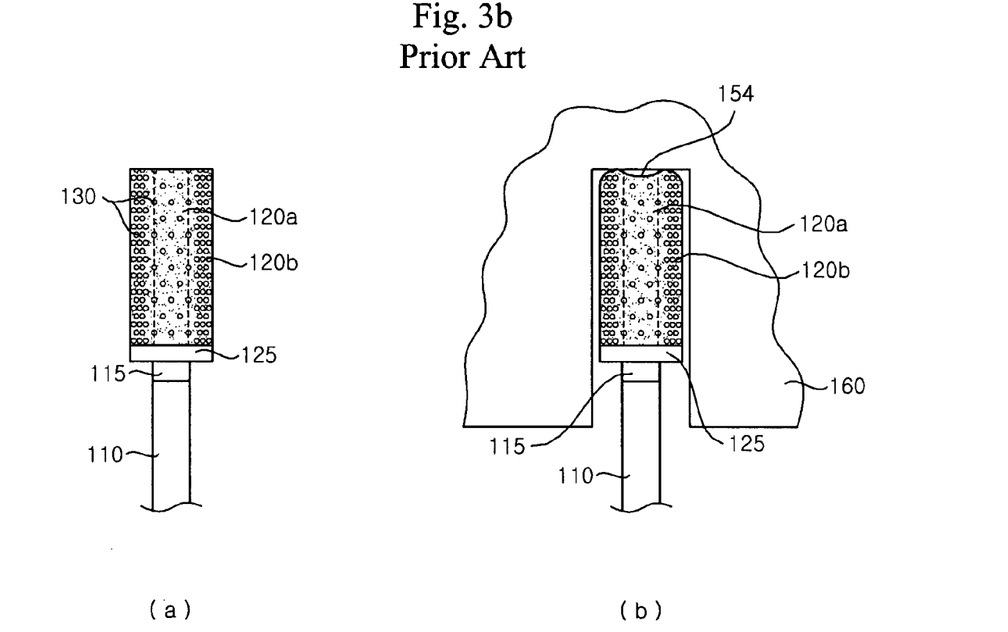
Figure 3C:
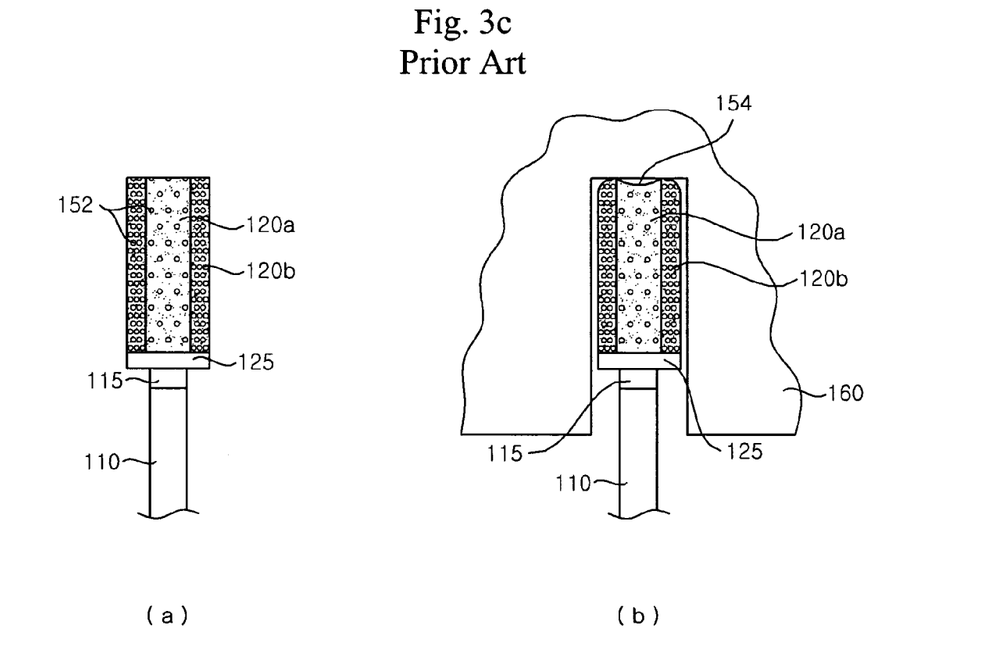

In order to solve the above problems, various approaches for fabricating a diamond tip have been proposed. One of them is presented in FIG. 3a (a). The cutting tip of FIG. 3a (a) is configured in such a manner that the content of abrasives 130 is uniform throughout an entire cutting tip, but the side metallic bonding material 120b has a higher wear resistance than that of the central metallic bonding material 120a. Thus, as shown in FIG. 3a (b), during the cutting process, a concave groove 154 is formed spontaneously, due to friction with the workpiece 160. Alternatively, as shown in FIG. 3b (a), in order for the wear resistance of the bonding material to be uniform throughout an entire cutting tip, the content of abrasives 130 may be made to be higher at the side portion of the cutting tip, as compared with the central portion thereof. Therefore, as shown in FIG. 3b (b), due to friction with a workpiece 160 during a cutting or grinding work, a concave groove 154 can be formed spontaneously. As another alternative, the cutting tip shown in FIG. 3c (a) is configured in such a way that the wear resistance of the side bonding material 120b is higher than that of the central bonding material 120a and also the abrasive content of the side portion is higher than that of the central portion. Therefore, as shown in FIG. 3c (b), a concave groove 154 is formed spontaneously due to friction with a workpiece 160.

In the conventional cutting tip manufacturing methods having the aforementioned construction, however, both side portions and the central portion of the cutting tip must be made to be different from each other in terms of their abrasive contents and their wear resistance. Therefore, the procedures for mixing the abrasives and the bonding materials and their powder-compaction become complicated. In addition, since the cutting tip has a three-layered structure of both side portions and the central portion, the press-forming process must require considering the properties of each layer appropriately, and thus becomes more complicated, as compared with the case having a uniform structure. Consequently, this complicated process will result in an increase in the manufacturing cost and a decrease in the productivity, and will be likely to cause errors of workers.

Furthermore, in the sintering process for the above cutting tip structure, since the abrasive contents and the wear resistances of bonding material in both side portions and the central portion are different, the shrinkage rates of the respective portions become different from each other. Thus, it is difficult to manufacture a sintered cutting tip having good mechanical properties. Also, in the design process therefor, there is a disadvantage in that the content of diamond particles must be adjusted and the wear resistance of bonding material must be determined, depending on the working conditions of tool, the workpiece to be machined, or the like after selecting one of the cutting tips shown in FIGS. 3a, 3b, and 3c.

SUMMARY OF THE INVENTION

The present invention has been conceived to solve the above problems. Accordingly, it is an object of the present invention to provide a diamond tool with a metal plate inserted therein, in which between abrasive layers formed with diamond particles is inserted a ferrous or non-ferrous metal plate having a wear resistance lower than that of the abrasive layers such that a concave groove is spontaneously formed during a cutting process, thereby reducing the contact load with a workpiece to thereby avoid vibration (wobbling) of a shank, and providing a discharge path for smoothly removing cutting chips and the cooling water; in addition, the content of abrasives and the wear resistance of bonding material are uniformly constituted so that the shrinkage rate does not need to be considered during sintering and the manufacturing process can be simplified, thereby reducing the manufacturing cost and improving the productivity therefor; and also the area of the metal plate can be controlled, thereby enabling an easy design conforming to the working conditions with a workpiece.

According to one aspect of the present invention for achieving the object, there is provided a cutting tip formed of a mixture of abrasives and a metallic bonding material, wherein at least one metal plate is inserted in the cutting tip. The cutting tip is formed in such a way that the mixture of abrasives and the metallic bonding material is press-compacted and sintered. At this time, the metal plate may be provided with through-holes formed in such a way to pass through the metal plate, a plurality of depressions formed in the surface thereof, or scratches formed on the surface thereof. The metal plate may be electroplated with a material capable of increasing a bonding force with the mixture. The metal plate is preferred to be formed such that the thickness thereof is in a range of 10~80% of that of the cutting tip including the metal plate and the mixture. The metal plate may be formed in such a manner that a flat metal plate is partially cut out to thereby provide an opening. In addition, the metal plate is formed of a single material or an alloy having a wear resistance lower than that of the mixture. The abrasives include natural or synthetic diamond, cubic boron nitride, silicone carbide, alumina, or a mixture of at least two thereof.

According to another aspect of the invention, there is provided a diamond tool comprising a shank and at least one cutting tip described above, wherein the cutting tip is bonded to the shank. Here, the diamond tool includes a saw, a core drill, a cutter, a saw blade, and a wire saw.

According to a further aspect of the invention, there is provided a method of manufacturing a cutting tip with a metal plate inserted therein, which is formed of abrasives and a metallic bonding material. The method of the invention comprises the step of inserting a metal plate into the cutting tip. The cutting tip manufacturing method comprises a press-forming step of compacting the metal plate and the mixture injected into a mold structured so as to obtain a desired shape. In addition, the press-forming step comprises a first press-forming step where a metal plate is inserted in the mixture and the metal plate and the mixture are compacted, and a second press-forming step where a metallic bonding material is further injected and compacted to thereby form a blank that is to be bonded to a shank of a tool.

The above first press-forming step may comprise a first step of injecting the mixture inside the mold, a second step of placing a metal plate on the mixture injected at the first step, a third step of injecting the mixture on the metal plate placed at the second step; and a fourth step of compacting the mixture and the metal plate prepared at the above first, second and third steps. The above second press-forming step may comprise a fifth step of adjusting the mold orientation and arrangement such that the injection of the metallic bonding material can be performed under the gravity of force, a sixth step of injecting a metallic bonding material into the mold adjusted at the fifth step, and a seventh step of compacting the metallic bonding material, the metal plate, and the mixture.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 1b is a cross-section taken along line I—I in FIG. 1a;

DETAILED DESCRIPTION OF THE PREFERRED EMBODIMENT

Hereinafter, preferred embodiments of the invention will be described in detail with reference to the accompanying drawings.

Figure 4:
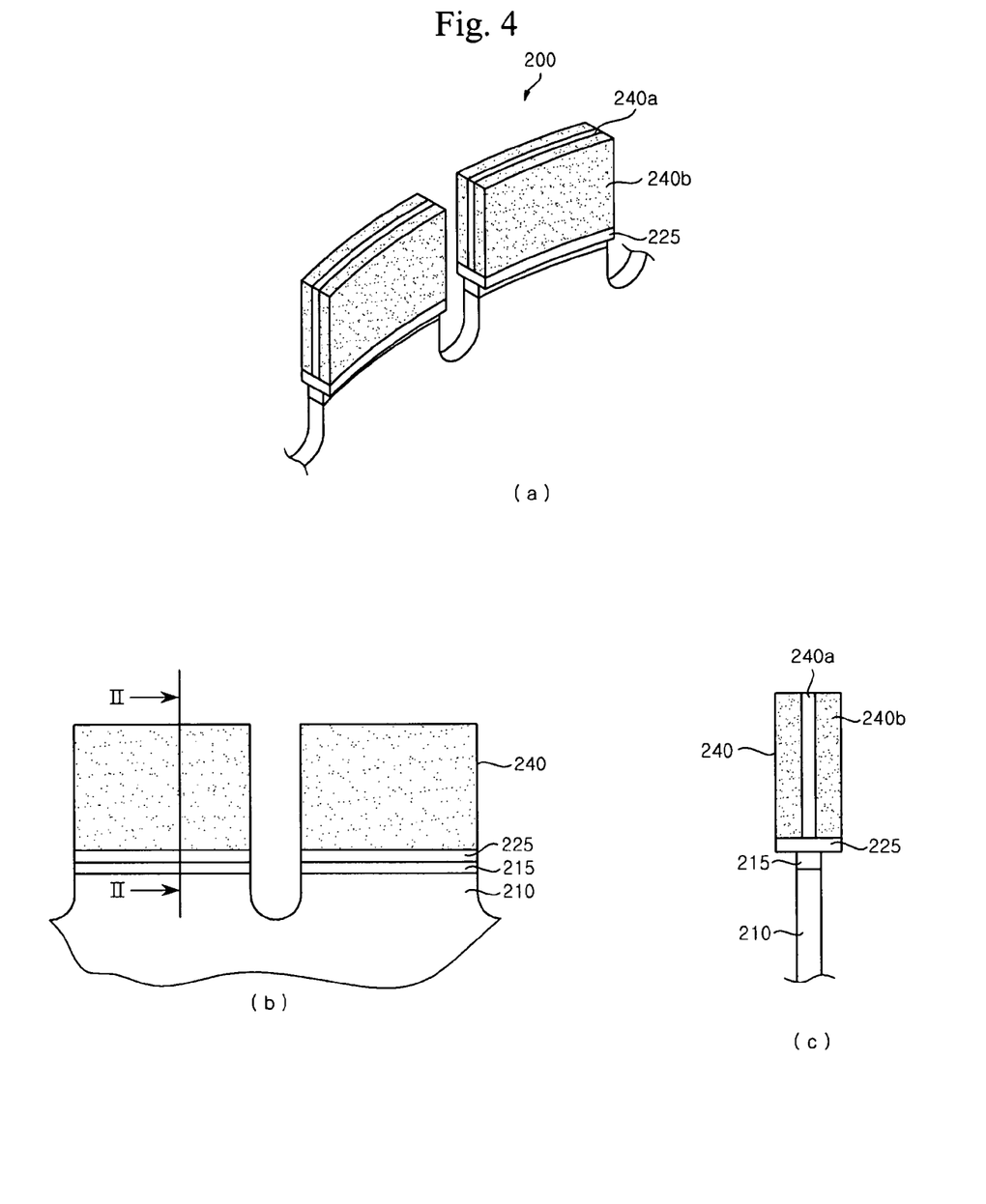
FIG. 4 is partial perspective, front and side views showing a saw blade according to one embodiment of the invention.

FIG. 4 is partial perspective, front and side views showing a saw blade according to one embodiment of the invention, where the saw blade of the invention is generally denoted at 200.

As illustrated in FIG. 4, the saw blade 200 of the invention is formed in such a manner that a mixture 240b of abrasives and a metallic bonding material and a metal plate 240a inserted into the mixture 240b are press-compacted and sintered to form a cutting tip, and then the sintered cutting tip is bonded to a shank. The cutting tip is bonded to the shank 210 through a weldment 215 formed by a laser welding, a silver blazing, a resistance welding, or the like.

Further details on the press-forming process of the above cutting tip will be hereinafter described, in conjunction with other figures.

Figure 5:
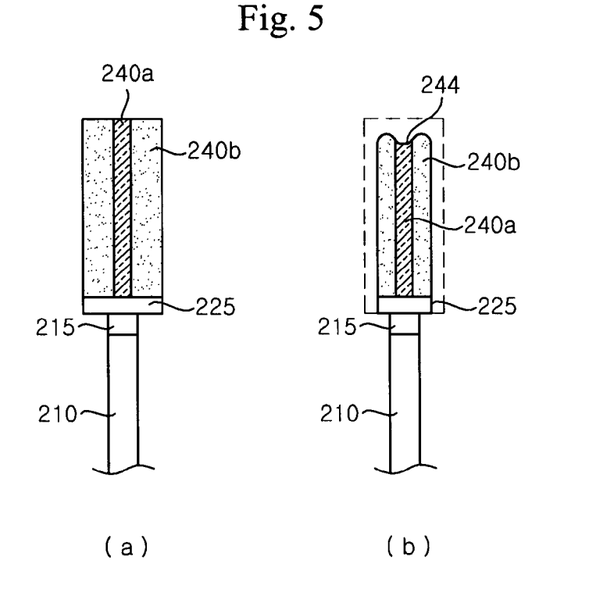
FIG. 5 is a side view of the saw blade of the invention in FIG. 4, where the leading edge portion of the cutting tip is worn by using the saw blade.

FIG. 5 is a side view of the saw blade of the invention in FIG. 4, where the leading edge portion of the cutting tip is worn by using the saw blade.

FIG. 5(a) is a cross-section taken along line II—II in the saw blade 200 of FIG. 4(b), and shows the unused state of a manufactured saw blade. If the saw blade 200 is used for a certain period of time in cutting a workpiece, in the leading edge portion of the cutting tip 240 is formed a concave groove 244, due to friction between the workpiece and the cutting tip 240. The concave groove 244 is formed along the circumferential direction of the saw blade, i.e., the cutting direction. The reason why the concave groove 244 is formed is in that the metal plate 240a inserted into the center of the cutting tip 240 is made of a metal or alloy having a wear resistance lower than that of the mixture 240b of abrasives and the metallic bonding material. Thus, during the cutting process, the central portion where the metal plate 240a is inserted is made to wear more than the remaining portion of the cutting tip. Also, due to the continuous friction between the release powder from the mixture 240b and the metal plate 240a, the concave groove 244 can maintain its concave shape.

As described above, when in use, the saw blade 200 of the invention forms the concave groove 244 spontaneously, which remains in the leading edge portion of the cutting tip 240. Therefore, to the left and right of the concave groove 244 are formed protrusions, which functions to maintain the good initial cutting force throughout a cutting process. Furthermore, the concave groove 244 serves as a discharging passage for the release cutting chips and the cooling water, thereby further improving the cutting performance thereof.

The thickness of the metal plate 240a is preferred to be in a range of 10%~80% of that of the entire cutting tip including the metal plate 240a and the mixture 240b. In case where the thickness of the metal plate 240a is below 10% of that of the whole cutting tip 240, the effect of forming the concave groove 244 is not adequate so that a good cutting performance can not be expected. When the thickness of the metal plate 240a is above 80% of that of the cutting tip, the mixture 240b of the abrasives and the metallic bonding material is easily released due to friction with the workpiece, thereby failing to provide a good cutting performance.

FIGS. 6a–6c, 7a–7c and 8a–8c illustrate modified embodiments of the metal plate to be inserted in the cutting tip according to the invention.

Figure 6A:
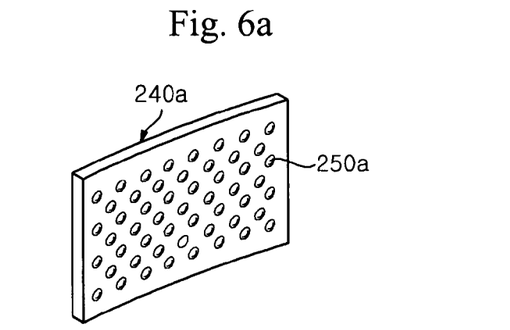
FIGS. 6a–6c, 7a–7c and 8a–8c illustrate modified embodiments of the metal plate to be inserted in the cutting tip according to the invention.

FIG. 6a is a perspective view of a metal plate 240a having a plurality of depressions 250a formed in the surface thereof. These fine depressions 250a function to improve the bonding force between the metal plate 240a and the mixture 240b. The depressions 250a may be formed preferably through a press-forming or an etching process.

Figure 6B:
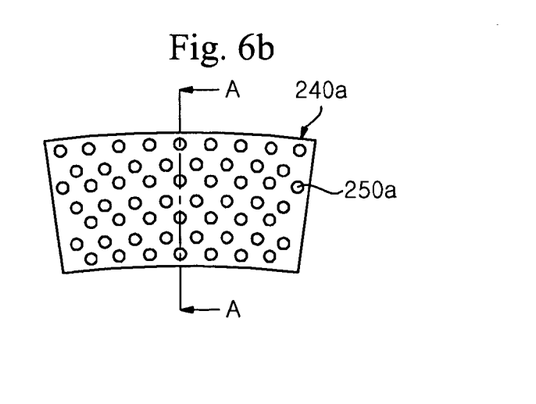
Figure 6C:
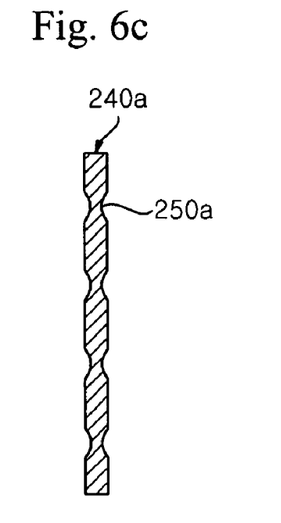

FIG. 6b is a side view of the metal plate 240a in FIG. 6a, and FIG. 6c is a cross-section taken along line A—A in FIG. 6b. FIGS. 6b and 6c explain more clearly the structure of the metal plate 240a and the shape of the depressions 250a formed therein.

Figure 7A:
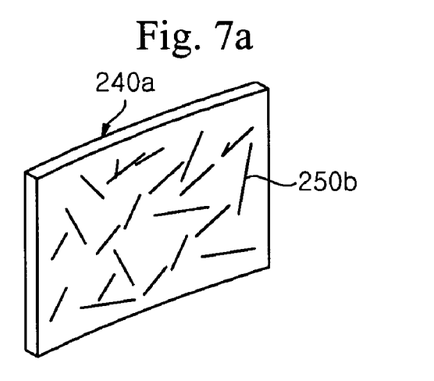

FIG. 7a is a perspective view of a metal plate 240a having scratches 250b formed in the surface thereof. The scratches 250b are formed so as to be able to increase the bonding force between the metal plate 240a and the mixture 240b. The scratches 250b may be formed preferably through a machining process, a sanding process, or a sand blasting process.

Figure 7B:
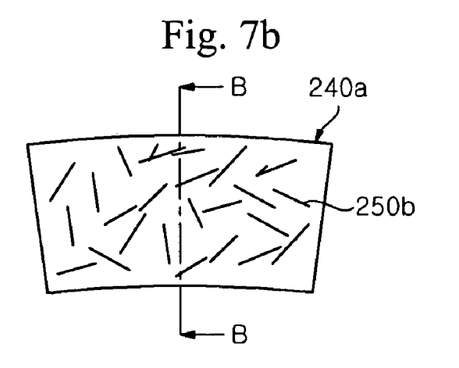
Figure 7C:
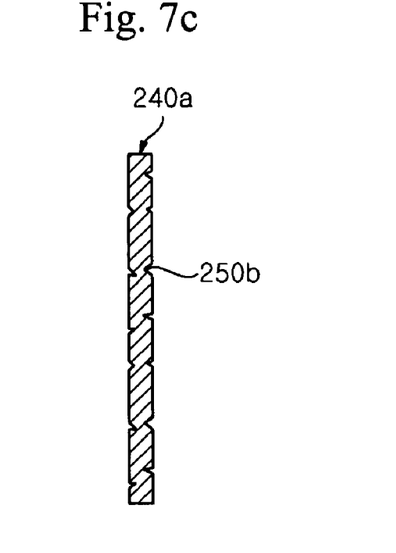

FIG. 7b is a side view of the metal plate 240a in FIG. 7a, and FIG. 7c is a cross-section taken along line B—B in FIG. 7b. FIGS. 7b and 7c are provided in order to explain more clearly the structure of the metal plate 240a and the shape of the scratches 250b in this embodiment.

Figure 8A:
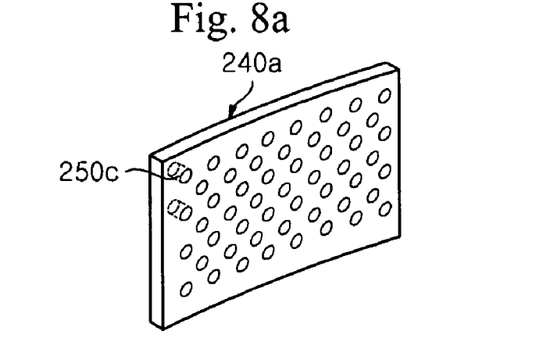

FIG. 8a is a perspective view of a metal plate 240a having a plurality of through-holes 250c formed therein. The through-holes 250c improve the bonding force between the metal plate 240a and the mixture 240b. The through-holes 250c may be formed in the metal plate 240a through a punching process. Preferably, the through-holes 250c may be formed, along with the depressions 250a of FIG. 6 or the scratch 250b of FIG. 7, thereby further increasing the bond force between the metal plate and the mixture.

Figure 8B:
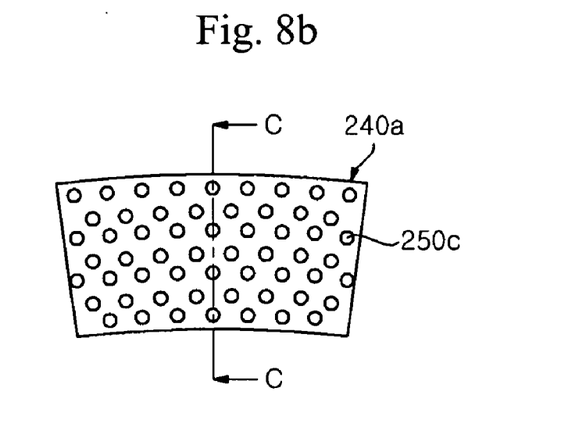
Figure 8C:
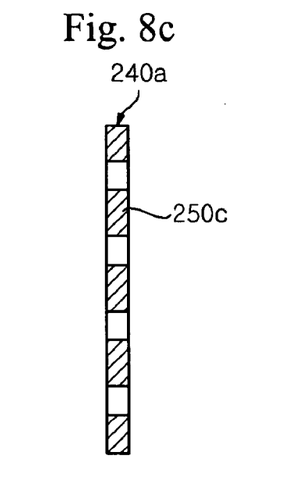

FIG. 8b is a side view of the metal plate 240a in FIG. 8a, and FIG. 8c is a cross-section taken along line C—C in FIG. 8b. FIGS. 8b and 8c illustrate more clearly the structure of the metal plate 240a and the shape of the through-holes 250c according to this embodiment. Furthermore, in order to improve the bonding force between the metal plate 240a and the mixture 240b, besides the above surface preparations, other surface treatments may be carried out. For example, a material capable of increasing the bonding force with the mixture 240b can be plated on the surface of the metal plate. Preferably, copper, which can provide a strong bonding force between the metal plate 240a and the mixture 240b during a sintering process, can be plated on the surface of the metal plate through a wet or dry electroplating process, so as to form a film on the surface thereof.

The depressions 250a, the scratches 250b and the through-holes 250c, which are shown in FIGS. 6, 7 and 8 respectively, are exaggeratedly illustrated for their relative sizes to that of the cutting tip, for the purpose of clear explanation. The numbers thereof are depicted more or less than the actual number of each of the depressions 250a, the scratches 250b and the through-holes 250c. In addition, the shape, the size, and the number of the depressions 250a, the scratches 250b and the through-holes 250c may be varied with the strength and ductility of a workpiece, etc. Furthermore, the depressions 250a, the scratches 250b, the through-holes 250c, and the plated film may be combined with one another in various ways.

FIG. 9 shows various embodiments of the metal plate of the invention where the metal plate has shapes other than a flat plate.

Figure 9A:
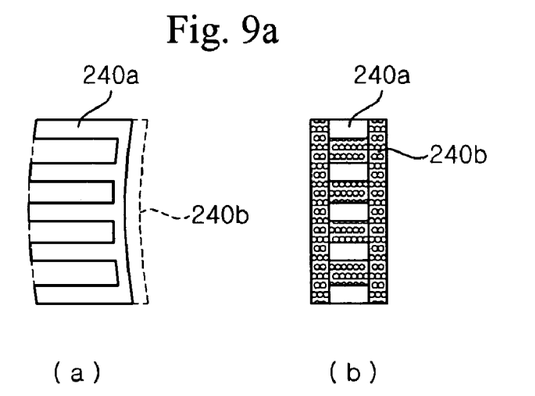
FIGS. 9a–9e show various embodiments of the metal plate of the invention where the metal plate has shapes other than a flat plate.
Figure 9B:
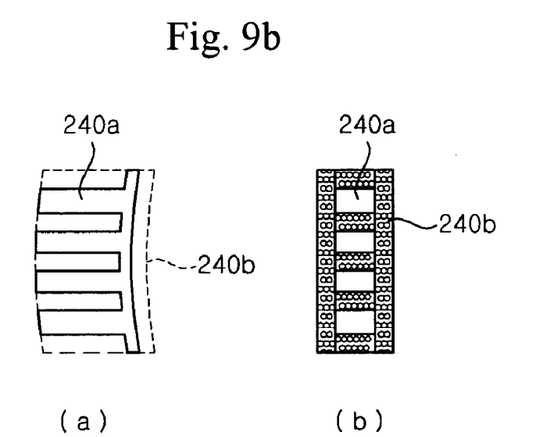
Figure 9C:
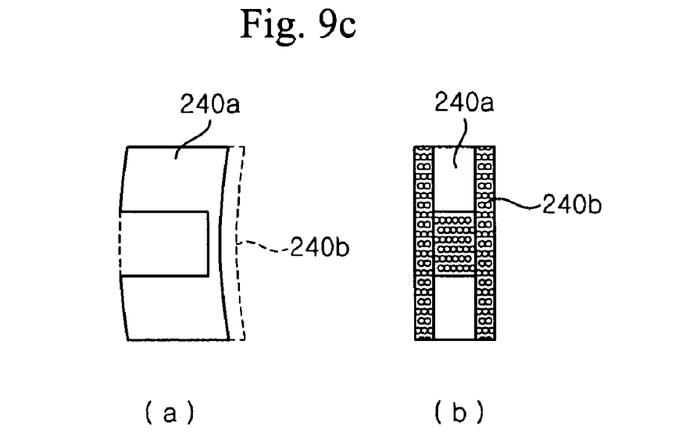
Figure 9D:
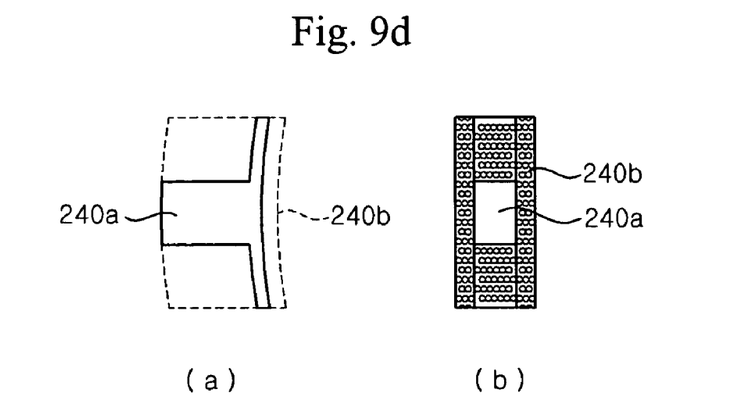
Figure 9E:
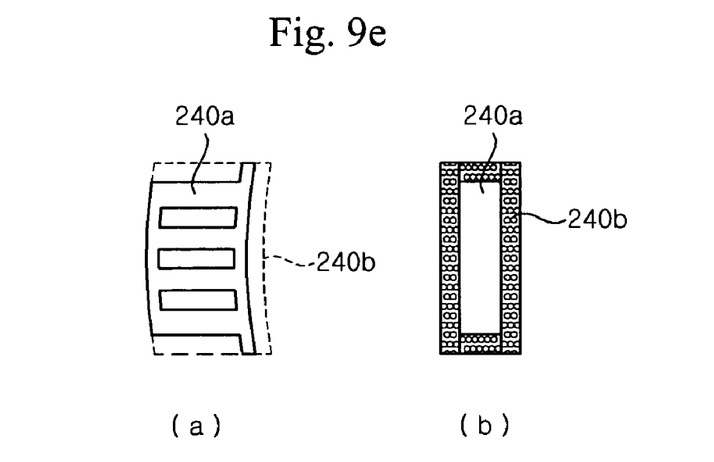

FIG. 9a (a), FIG. 9b (a), FIG. 9c (a), FIG. 9d (a), and FIG. 9e (a) show metal plates structured in such a manner that the metal plate 240a is partially cut out to form openings. FIG. 9a (b), FIG. 9b (b), FIG. 9c (b), FIG. 9d (b), and FIG. 9e (b) show cutting faces of the metal plates, which are seen from the left side of the metal plates of FIG. 9a (a), FIG. 9b (a), FIG. 9c (a), FIG. 9d (a), and FIG. 9e (a).

The metal plate 240 having the constructions shown in FIG. 9 allows a discontinuous concave groove 244 to form spontaneously during a cutting process, thereby providing an effect of forming an uneven cutting surface such as a prominent and depressed surface, or a saw-like cutting surface. Thus, by further considering cutting conditions with a workpiece, various designs capable of obtaining a good cutting performance can be allowed.

The following table compares the cutting loads, respectively in case of the saw blade of the invention where the metal plate 240a of modified shapes of FIG. 9 is applied to the cutting tip thereof, and in case of a convention saw blade where the cutting tip is formed only of diamond particles and a metallic bonding material.

| Cutting Tip | Prior Art | FIG. 9a | FIG. 9e |
|---|---|---|---|
| Cutting Load (Kw) | 7.1 | 5.1 | 5.9 |

The results summarized in the above table have been obtained in the experiment, where a saw blade having an outer diameter of 450 mm, twenty-five (25) cutting tips was used in both the conventional case and the present invention. The length, height and thickness of cutting tip were 40 mm, 20 mm and 3.4 mm respectively. Granite was used as a workpiece. In the case of the present invention, the inserted metal plate had a thickness of 1.2 mm, and was made of SCM 435. On the surface of the metal plate was plated with copper in a thickness of about 2 mm, in order to increase the bonding force between the metal plate and the mixture of abrasives and metallic bonding material.

When about 2.7 m2 of the workpiece was cut, the average used power was 7.1 kW in the conventional case, but in case where the cutting tip 240 of FIG. 9a was used, the average used power was 5.1 kW (28.2% reduction), and in case of the cutting tip 240 of FIG. 9e, the average used power was 5.9 kW (16.9% reduction). That is, since the metal plate 240a was inserted into the central area of the cutting tip, a concave groove 244 was formed spontaneously during the cutting process. Therefore, the reduction in the average power is considered as having been caused by reduction in the cutting load due to the decreased cutting area with the workpiece. In the conventional case where a concave groove 244 is not formed, the cutting process caused the rounding of the cutting tip and thus increased the contact area, which resulted in the increased load and vibration of the cutting tip 240. In addition, this vibration was transferred into the shank 210 to thereby cause the wobbling thereof. In case of the present invention, the increase in the cutting load and the wobbling phenomenon could be prevented.

It is understood by those skilled in the art that the shape of the metal plate 240a can be modified in various other forms, depending on cutting conditions with a workpiece, and thus the shape of the metal plate 240a of the invention is not limited to those as illustrated above.

Figure 10:
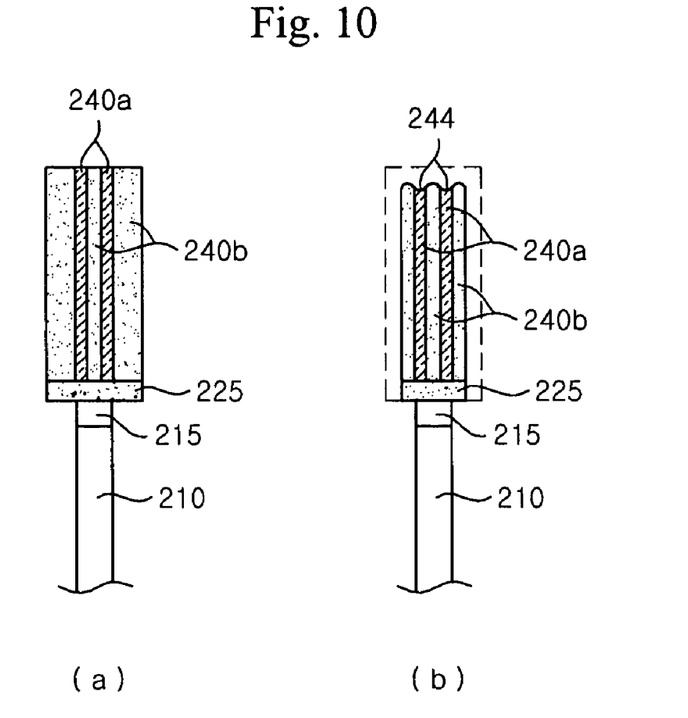
FIG. 10 illustrates a cutting tip according to one embodiment of the invention, where two or more metal plates are inserted into the cutting tip.

FIG. 10 illustrates a cutting tip according to one embodiment of the invention, where two or more metal plates are inserted into the cutting tip.

As illustrated in FIG. 10, the number of the metal plate 240a, which is inserted in the cutting tip 240 according to the invention, may be two or more. In this way, if two metal plates 240a are inserted in the cutting tip, then two concave grooves 244 are formed in the leading edge portion during a cutting process. Therefore, the number of the metal plates 240a can be varied with the cutting conditions with a workpiece, thereby enabling an optimum design capable of providing a maximum cutting performance. It should be understood by those skilled in the art that the number of the metal plates can be varied and is not limited to the illustrated ones in the description.

Figure 11:
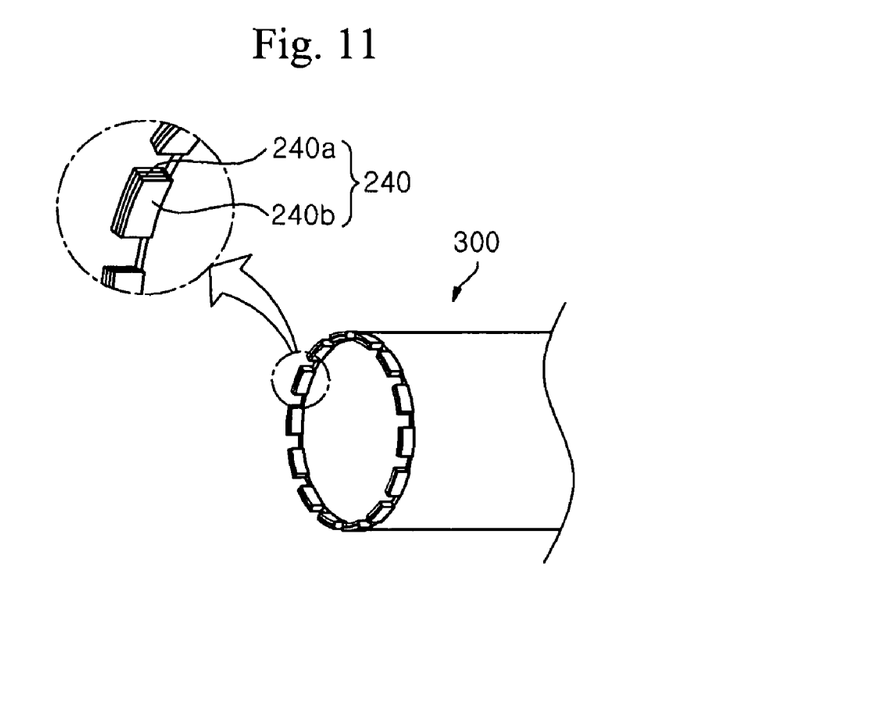
FIG. 11 illustrates a cutting tip according to one embodiment of the invention, where the cutting tip of the invention is applied to a core drill.

FIG. 11 illustrates a cutting tip according to one embodiment of the invention, where the cutting tip of the invention is applied to a core drill.

As above, the present invention has been described while illustrating a saw blade as one preferred embodiment of the invention. Besides the saw blade, the invention may be applied to other types of tools as well such as a saw, a core drill, a cutter, a wire saw, or the like. By way of an example, FIG. 11 shows a core drill 300 to which the present invention is applied. In this example, the shape of the shank and the bonding position of the cutting tip 240 are different from previous examples, but a metal plate is formed at the front face of a diamond tool, i.e., in the leading edge portion of the cutting tip along the cutting direction thereof. That is, the present invention can be applied to various other tools.

Figure 12A:
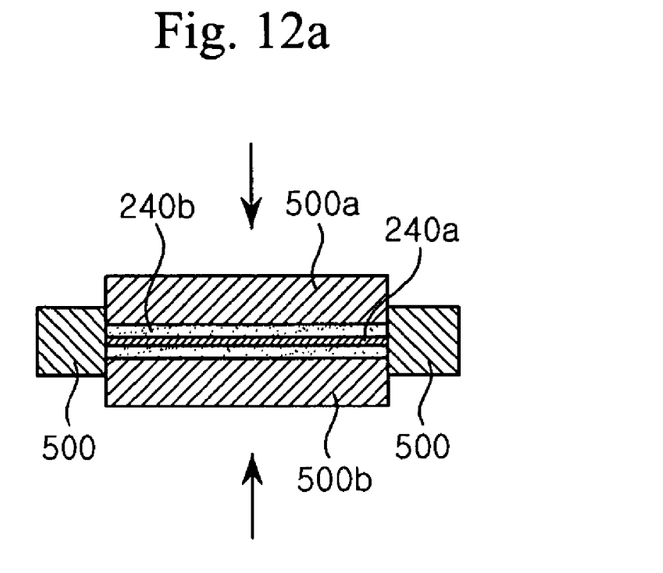
FIGS. 12a and 12b illustrate a process for manufacturing a cutting tip according to the invention.
Figure 12B:
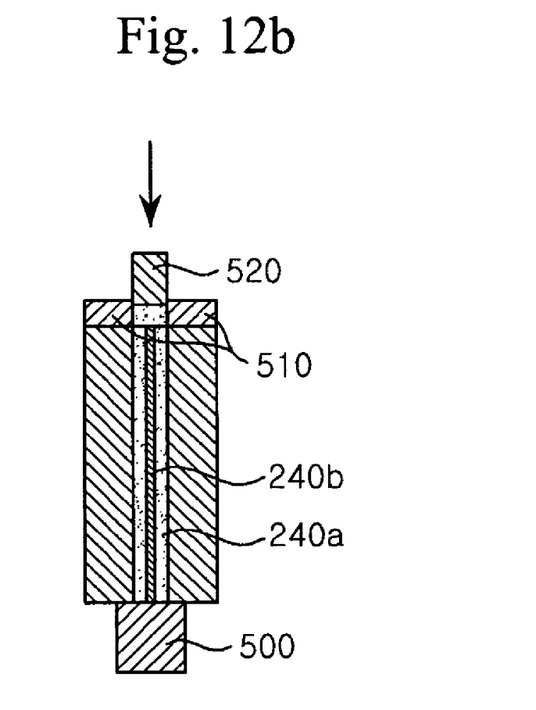

FIGS. 12a and 12b illustrate a process for manufacturing a cutting tip according to the invention.

In the process for manufacturing the cutting tip 240 of the invention, first, metal powder to be used as a bonding material is uniformly mixed appropriately according to the characteristics of the bonding material, and then coated with a resin material such as wax to thereby be made into a bulk form having a desired size, such as abrasives. Thereafter, a de-waxing treatment is carried out to remove the wax. Next, after diamond particles are mixed with the above pre-treated metal powder, the mixture is formed with a metal plate 240a inserted therein by exerting a certain pressure thereto so as to have a desired shape of cutting tip. That is, in order to form the cutting tip, the mixture is subjected to a press-forming process as illustrated in FIGS. 12a and 12b.

FIGS. 12a and 12b show a mold 500 for press-forming the mixture of abrasives and the metal powder. The mold 500 has a structure corresponding to the shape of a cutting tip 240 to be manufactured. The top and bottom of the mold 500 are opened such that an upper punch 500a and a lower punch 500b corresponding to the respective side shapes of the cutting tip 240 can be inserted therein.

First, the aforementioned, pretreated mixture 240b of metal powder and diamond particles is injected on the lower punch inside the mold, and then a metal plate 240a is placed on the injected mixture. Thereafter, again, the mixture is injected on top of the metal plate. The upper and lower punches are pressed inwards of the mold 500 to thereby perform a primary press-forming process. Next, the orientation of the mold 500 is adjusted so as to be erected vertically in the direction of gravity, i.e., in the direction of mixture injection. At this time, the mixture 240b injected inside the mold 500 is not to be lost during the adjustment of mold position. Then, the upper part of the mold 500 is removed and an auxiliary mold 510 is placed instead so as to be able to form a blank 225, and a metal powder not containing abrasives is injected into the auxiliary mold. Again, using an auxiliary punch 520, a secondary press-forming process is performed, thereby completing a press-forming process to prepare a pre-form for a cutting tip 240. After that, the pre-form of cutting tip is sintered so as to have desired mechanical and physical properties. The sintered cutting tip 240 is bonded to a shank through a silver brazing, a laser welding, a resistance welding, or the like, thereby obtaining a diamond tool.

Similarly, it should be understood by those skilled in the art that a press-forming process to be used in the invention is not limited to the aforementioned specific embodiment, but various other modifications and variations may occur within the scope of the invention.

Figure 13:
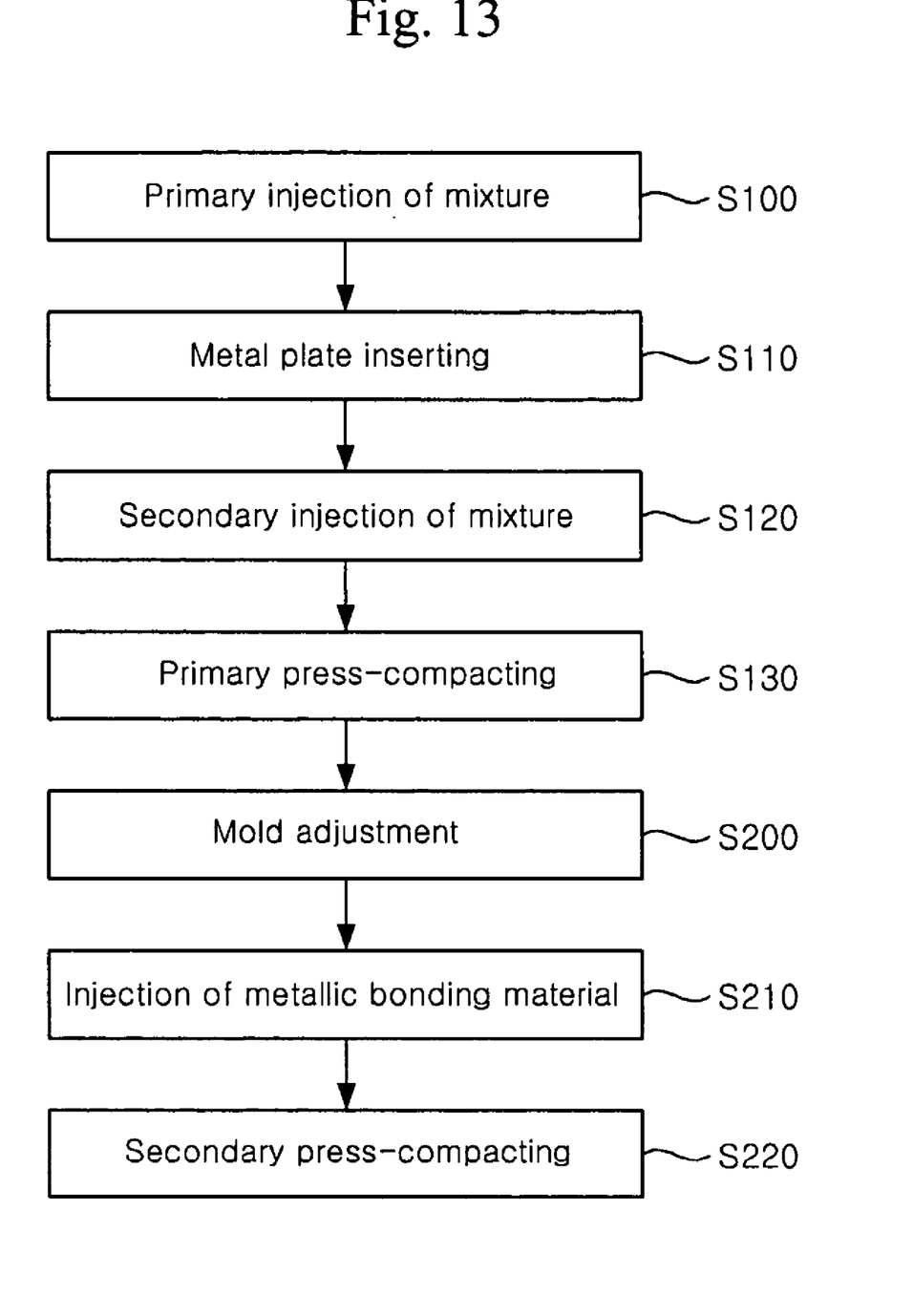
FIG. 13 is a flow chart showing a process for manufacturing a cutting tip according to the invention.

FIG. 13 is a flow chart showing a process for manufacturing a cutting tip according to the invention.

As illustrated in FIG. 12, in the press-forming process according to the invention, a metal plate 240a is inserted in the mixture 240b, which is injected into the mold 500 structured so as to obtain a desired shape of cutting tip. The press-forming process of the invention is comprised of a first press-forming step (S100~S130) where the mixture 240b is primarily compacted with a metal plate 240a contained therein, and a second press-forming step (S200~S220) where a metallic bonding material is further injected and compacted secondarily to thereby form a blank 225, through which the resultant cutting tip is bonded to the shank of a tool.

In the first press-forming step (S100~S130), the mixture 240b is primarily injected inside the mold (S100), and a metal plate 240a is placed on the mixture 240b (S110), which is injected primarily at the step S100. Then, the mixture 240b is secondarily injected on the metal plate 240a (S120), which is inserted at the step S110. The resultant mixture with the metal plate inserted therein is press-compacted primarily (S130). Next, in the second press-forming step (S200~S220), the mold orientation and arrangement are adjusted such that the injection of the metallic bonding material can be carried out along the direction of gravity (S200). The metallic bonding material is injected into the mold (S210), which is adjusted at the step S200. The mixture 240b, the metal plate 240a and the metallic bonding material, which are prepared at the step S210, are compacted (S220).

As described above, in the diamond tool having an inserted metal plate according to the invention, between abrasive layers formed with diamond particles is inserted a ferrous or non-ferrous metal plate having a wear resistance lower than that of the abrasive layers such that a concave groove is spontaneously formed during a cutting process, thereby reducing the contact load with a workpiece to thereby avoid vibration (wobbling) of a shank, and providing a discharge path for smoothly removing cutting chips and the cooling water. In addition, the content of abrasives and the wear resistance of bonding material are uniformly constituted so that the shrinkage rate does not need to be considered during sintering and the manufacturing process can be simplified, thereby reducing the manufacturing cost and improving the productivity therefor. Furthermore, the area of the metal plate can be controlled, thereby enabling an easy design conforming to the working conditions with a workpiece.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A cutting tip comprising:
   a mixture of abrasives and a metallic bonding material; and
   at least one metal plate inserted in the mixture of abrasives and metallic bonding material, wherein a first portion of the metal plate extends to a cutting face of the cutting tip and a second portion of the metal plate adjacent to the first portion does not extend to the cutting face of the cutting tip.

2. The cutting tip as claimed in claim 1, wherein the cutting tip is formed in such a way that the mixture of abrasives and the metallic bonding material is press-compacted and sintered.

3. The cutting tip as claimed in claim 1, wherein the metal plate is electroplated with a material capable of increasing a bonding force with the mixture.

4. The cutting tip as claimed in claim 1, wherein the metal plate is formed such that the thickness thereof is in a range of 10~80% of that of the cutting tip including the metal plate and the mixture.

5. The cutting tip as claimed in claim 1, wherein a first metal plate and a second metal plate are inserted in the mixture of abrasives and metallic bonding material, the first metal plate being separated from the second metal plate by a layer of the mixture.

6. The cutting tip as claimed in claim 1, wherein the metal plate is formed of a single material or an alloy having a wear resistance lower than that of the mixture.

7. The cutting tip as claimed in claim 1, wherein the abrasives include natural or synthetic diamond, cubic boron nitride, silicone carbide, alumina, or a mixture of at least two thereof.

8. The cutting tip of claim 1, wherein the metal plate has a plurality of portions extending to the cutting face of the cutting tip, wherein each extending portion is alternately spaced with portions of the metal plate that do not extend to the cutting face of the cutting tip.

9. The cutting tip of claim 8, wherein the metal plate is formed of a material with less wear resistance than the mixture such that a saw-like cutting face is formed during a cutting process.

10. The cutting tip of claim 1, wherein the first extending portion of the metal plate includes at least one hole.

11. The cutting tip of claim 1, wherein the mixture is formed in a recess adjacent to the first extending portion of the metal plate.

12. A cutting tip with a metal plate inserted therein, the cutting tip being formed of a mixture of abrasives and a metallic bonding material, wherein at least one metal plate is inserted in the cutting tip and electroplated with a material capable of increasing a bonding force with the mixture.

13. The cutting tip as claimed in claim 12, wherein the cutting tip is formed in such a way that the mixture of abrasives and the metallic bonding material in press-compacted and sintered.

14. The cutting tip as claimed in claim 12, wherein the metal plate is formed such that the thickness thereof is in the range of 10~80% of that of the cutting tip including the metal plate and the mixture.

15. The cutting tip as claimed in claim 12, wherein a first metal plate and a second metal plate are inserted in the mixture of abrasives and metallic bonding material, the first metal plate being separated from the second metal plate by a layer of the mixture.

16. The cutting tip as claimed in claim 12, wherein the metal plate is formed of a single material or an alloy having a wear resistance lower than that of the mixture.

17. The cutting tip as claimed in claim 12, wherein the abrasives include natural or synthetic diamond, cubic boron nitride, silicone carbide, alumina, or a mixture of at least two thereof.

18. A method of manufacturing a cutting tip with a metal plate inserted therein, the cutting tip being formed of abrasives and a metallic bonding material, the method comprising the step of:
  inserting a metal plate into the cutting tip, wherein a first portion of the metal plate extends to a cutting face of the cutting tip and a second portion of the metal plate adjacent to the first portion does not extend to the cutting face of the cutting tip.

* * * * *